(12) United States Patent
Han et al.

(10) Patent No.: US 8,900,461 B2
(45) Date of Patent: Dec. 2, 2014

(54) APPARATUS AND METHOD FOR TREATING SHIP BALLAST WATER USING ELECTRON BEAMS

(75) Inventors: Bum Soo Han, Daejeon (KR); Jin Kyu Kim, Daejeon (KR); Yu Ri Kim, Gyeryong-si (KR); Ho Kang, Daejeon (KR)

(73) Assignee: EB-Tech Co., Ltd., Daejeon (KR)

( * ) Notice: Subject to any disclaimer, the term of this patent is extended or adjusted under 35 U.S.C. 154(b) by 573 days.

(21) Appl. No.: 13/033,682

(22) Filed: Feb. 24, 2011

(65) Prior Publication Data

US 2011/0240565 A1     Oct. 6, 2011

(30) Foreign Application Priority Data

Apr. 6, 2010   (KR) .......................... 10-2010-0031508

(51) Int. Cl.
*C02F 1/30* (2006.01)
*B63J 4/00* (2006.01)
*C02F 103/00* (2006.01)

(52) U.S. Cl.
CPC .............. *C02F 1/305* (2013.01); *B63J 4/002* (2013.01); *C02F 2103/008* (2013.01); *C02F 2209/40* (2013.01); *C02F 2209/42* (2013.01); *C02F 2303/04* (2013.01)
USPC .............. 210/748.01; 210/741; 210/748.02; 210/748.11; 210/747.6; 210/634; 422/186; 422/186.3; 205/435; 405/128.5; 405/128.1; 405/128.15; 405/128.45; 405/128.75

(58) Field of Classification Search
CPC .................................. C02F 1/30; G01N 23/12
USPC .............. 210/741, 108, 137, 634, 742, 744, 210/747.6, 748.1, 748.02, 748.03, 748.11, 405/128.5, 128.1, 128.15, 128.2, 405/128.25, 128.3, 128.45, 128.7, 128.75
See application file for complete search history.

(56) References Cited

U.S. PATENT DOCUMENTS

| | | | |
|---|---|---|---|
| 5,785,866 A | * | 7/1998 | Gehringer et al. ........ 210/748.16 |
| 6,756,597 B2 | * | 6/2004 | Avnery et al. ................. 250/433 |
| 2009/0321365 A1 | * | 12/2009 | Eriksson et al. .............. 210/741 |

* cited by examiner

*Primary Examiner* — Walter D Griffin
*Assistant Examiner* — Cameron J Allen
(74) *Attorney, Agent, or Firm* — WRB-IP LLP

(57) ABSTRACT

Disclosed herein are an apparatus and method for treating ship ballast water, wherein electron beams are irradiated into the ballast water to induce radiolysis of the water, and harmful marine organisms present in the ballast water are killed by radicals produced by the radiolysis. The electron beams are continuously irradiated into the ballast water under operating conditions of an energy of 0.5-5 MeV, an electron beam irradiation dose of 0.1-30 kGy and a flow rate of 1-200 m$^3$/hr.

3 Claims, 5 Drawing Sheets

APPARATUS AND METHOD FOR TREATING SHIP BALLAST WATER USING ELECTRON BEAMS

BACKGROUND OF THE INVENTION

1. Field of the Invention

The present invention relates to an apparatus and method for treating ballast water charged in a ship, and more particularly to an apparatus and method for treating ship ballast water using electron beams, which can prevent the occurrence of red tide by destroying and damaging the cells of harmful marine organisms, including viruses, bacteria and red algae, that are present in the ballast water, by electron beam irradiation, and thus can remove various contaminants from the ballast water and increase the efficiency of treatment of the ballast water.

2. Description of the Prior Art

Generally, a ship repeats a process of charging ballast water into a ballast tank or discharging the ballast water from the ballast tank depending on whether the vessel is loaded with a cargo, in order to maintain its balance. Typically, the ballast water is charged at the port of departure and discharged at the port of arrival.

As ballast water, seawater is mostly used. It was reported that ballast water contains various marine organisms, including plankton, bacteria, or protozoans causing red tide, and that the ballast water is easily contaminated with these organisms during the voyage of the ship.

For this reason, ballast water containing various contaminants or marine organisms such as red algae is discharged to the coast and contaminates the coast. Particularly, foreign marine organisms are moved to various countries through the ballast water of the ship, thus destroying or disturbing the ecosystem, causing serious damage. In order to resolve this serious problem, the convention of the International Maritime Organization (IMO) requires ships to be fitted with a ballast water treatment apparatus.

With respect to the prior art relating to the treatment of ballast water of a ship, techniques of sterilizing the ballast water using ozone, electrolysis, chemicals or UV irradiation have been mainly used, but there was a problem in that the treatment efficiency for removal of contaminants is low. Particularly, the techniques that use ozone, chemicals or UV irradiation can possibly cause secondary contamination.

SUMMARY OF THE INVENTION

Accordingly, the present invention has been made in view of the problems occurring in the prior art, and it is an object of the present invention to provide an apparatus and method for treating ship ballast water using electron beams, which can prevent the occurrence of red tide by destroying and damaging the cells of harmful marine organisms, including viruses, bacteria and red algae, that are present in the ballast water, by electron beam irradiation, and which can remove various contaminants from the ballast water and prevent the destruction and disturbance of the ecosystem.

Another object of the present invention is to provide an apparatus and method for treating ship ballast water using electron beams, which are designed so that the electron beam can be continuously injected, thus improving treatment efficiency for removal of contaminants from the ship ballast water.

Still another object of the present invention is to provide an apparatus and method for treating ship ballast water using electron beams, which can increase the efficiency of treatment of the ballast water and, at the same time, eliminate the possibility of secondary contamination.

To achieve the above objects, according to one aspect of the present invention, there is provided an apparatus for treating ship ballast water using electron beams, comprising: a storage tank to which ballast water stored in a ballast tank is supplied and from which the ballast water is constantly introduced into an electron beam irradiation means; the electron beam irradiation means into which the ballast water supplied to the storage tank is introduced through a ballast water supply line, and which serves to irradiate electron beams into the ballast water to induce radiolysis of the water and in which radicals produced by the radiolysis kill harmful marine organisms present in the ballast water, thereby sterilizing the ballast water; a holding tank into which the ballast water sterilized by electron beam irradiation means is introduced and in which the introduced ballast water is temporarily stored; and a pump for smooth supply, transfer and discharge of the ballast water.

In the apparatus of the present invention, the electron beam irradiation means preferably comprises: a reactor into which the ballast water is introduced from the storage tank and which serves to induce a reaction by electron beam irradiation; an electron beam injection nozzle provided so that it can inject an electron beam into the ballast water being introduced into the reactor; and an electron accelerator connected to the electron beam injection nozzle so that it can supply the electron beam to the electron beam injection nozzle.

According to another aspect, there is provided a method for treating ship ballast water using electron beams, comprising an electron beam irradiation step of irradiating electron beams into the ballast water to induce radiolysis of water and killing harmful marine organisms present in the ballast water by radicals produced by the radiolysis.

In the method of the present invention, the electron beam irradiation stem preferably comprises continuously injecting electron beams into the ballast water under operating conditions of an energy of 0.5-5 MeV, an electron beam irradiation dose of 0.1-30 kGy and a flow rate of 1-200 m$^3$/hr.

BRIEF DESCRIPTION OF THE DRAWINGS

The above and other objects, features and advantages of the present invention will be more clearly understood from the following detailed description taken in conjunction with the accompanying drawing, in which.

DETAILED DESCRIPTION OF THE INVENTION

Hereinafter, preferred embodiments of an apparatus and method for treating ship ballast water according to the present invention will be described in detail with reference to the accompanying drawings. The objects, features and advantages of the present invention will be more fully understood from these examples.

Figure 1:
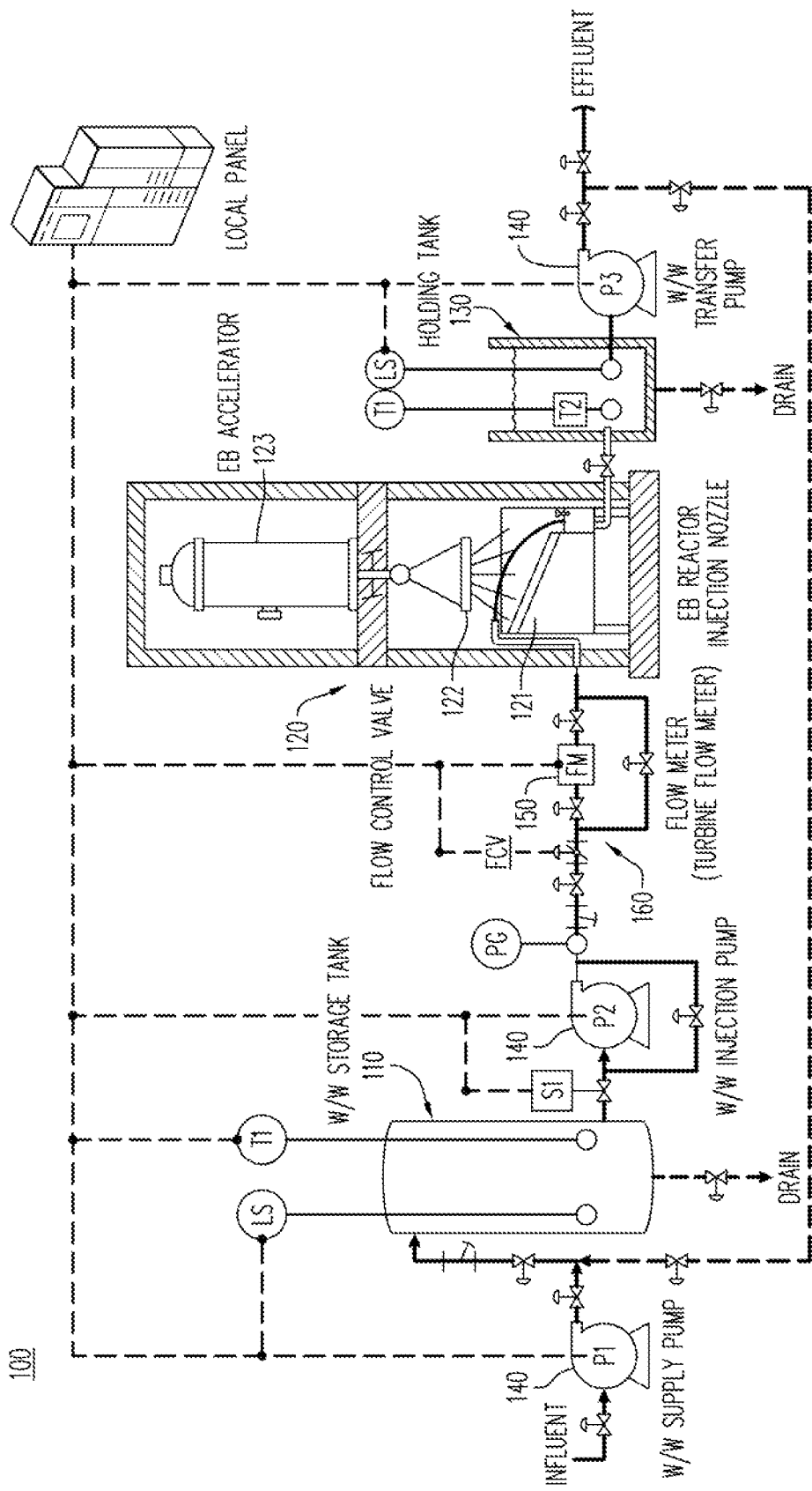
FIG. 1 shows the structure of an apparatus for treating ship ballast water using electron beams according to the present invention.

As shown in FIG. 1, an apparatus 100 for treating ship ballast water using electron beams according to an embodiment of the present invention is an apparatus for removing contaminants from the ballast water charged in the ballast tank of the ship and comprises: a storage tank 110 to which the ballast water stored in the ballast tank is supplied and from which the ballast water is constantly introduced into an electron beam irradiation mean 120; the electron beam irradiation means 120 into which the ballast water supplied to the storage tank 110 is introduced through a ballast water supply line 160 and which serves to irradiate the ballast water with electron beams to induce radiolysis of the water so that radicals produced by the radiolysis kill harmful marine organisms present in the ballast water, thereby sterilizing the ballast water; a holding tank 130 into which the ballast water sterilized by electron beam irradiation in the electron beam irradiation means 120 and in which the introduced ballast water is temporarily stored; and pumps 140 for supplying, delivering and discharging the ballast tank water and the sterilized ballast water.

In the apparatus 100 of the present invention, the electron beam irradiation means 120 comprises: a reactor 121 into which the ballast water is introduced from the storage tank 110 and in which a reaction is induced by electron beam irradiation; an electron beam injection nozzle placed in such a manner that it can inject an electron beam into the ballast water introduced into the reactor 121; and an electron accelerator connected to the electron beam injection nozzle 122 so that it can supply an electron beam to the electron beam injection nozzle 122.

The electron accelerator 123 has an extraction window (not shown) has an extraction window (not shown) for extracting the accelerated electron beam. To the extraction window, the electron beam injection nozzle 122 is connected, and the injection hole of the electron beam injection nozzle 122 is disposed to direct toward the ballast water that is introduced into the reactor 121.

Preferably, the electron accelerator 123 is operated under conditions of an energy of 0.5-5 MeV, an electron beam irradiation dose of 0.1-30 kGy and a flow rate of 1-200 m$^3$/hr, so that electron beams can be continuously irradiated into the ballast water that is introduced into the reactor 121 and the treatment efficiency can be increased.

Preferably, a flow meter 150 is provided on the ballast water supply line 160 so that the ballast water being supplied can be measured. The flow meter 150 is preferably disposed in the front of the reactor 121.

Both the storage tank 110 and the holding tank 130 are provided with a level limit switch LS so that the level of the ballast water can be controlled.

The pump 140 is preferably provided in plurality for the smooth supply, transfer and discharge of the ballast water. As shown in FIG. 1, the pump 140 may be disposed in the front of the storage tank 110 and in the front of the reactor 121 and also in the rear of the holding tank 130.

Hereinafter, the operation of the above-described apparatus for treating ship ballast water using electron beams according to the present invention, and the method of treating ship ballast water using the inventive apparatus will be described with reference to FIGS. 1 and 2.

In order to constantly supply the ballast water stored in the ballast-tank to the reactor 121 of the electron beam irradiation mean 120, the ballast water is first supplied to the storage tank 110 and transferred to and introduced into the reactor 121.

Herein, the ballast water being introduced into the reactor 121 can be transferred or supplied to the reactor or injected through a nozzle connected to the inlet pipe.

The ballast water introduced into the reactor 121 is irradiated with a high-energy electron beam that is accelerated by the electron accelerator 123. When the electron beam is injected through the electron beam injection nozzle 122 connected to the electron accelerator 123, the electron beams are continuously injected into the ballast water from the electron accelerator 123 which is operated under conditions of an energy of 0.5-5 MeV, an electron beam irradiation dose of 0.1-30 kGy and a flow rate of 1-200 m$^3$/hr.

The electron beams that are injected into the ballast water introduced into the reactor 121 transfer energy to the surrounding environment while making a very complex trace. Due to the transferred energy, the ballast water undergoes radiolysis while the following radicals and ions are produced: $e^-_{aq}$, H, OH, O$^-$, H$_2$, H$_2$O$_2$, H$^+_{aq}$ and OH$^-_{aq}$. Of these radicals and ions, electrons ($e^-_{aq}$), hydrogen atoms (H) and hydroxyl radicals (OH), which have a high oxidation-reduction potential and are highly reactive, destroy the cell wall of various harmful marine organisms, including red algae or bacteria, or break the bonds between intracellular nucleic acids (DHA) of the marine organisms, thereby killing the marine organisms and sterilizing the ballast water.

Figure 2:
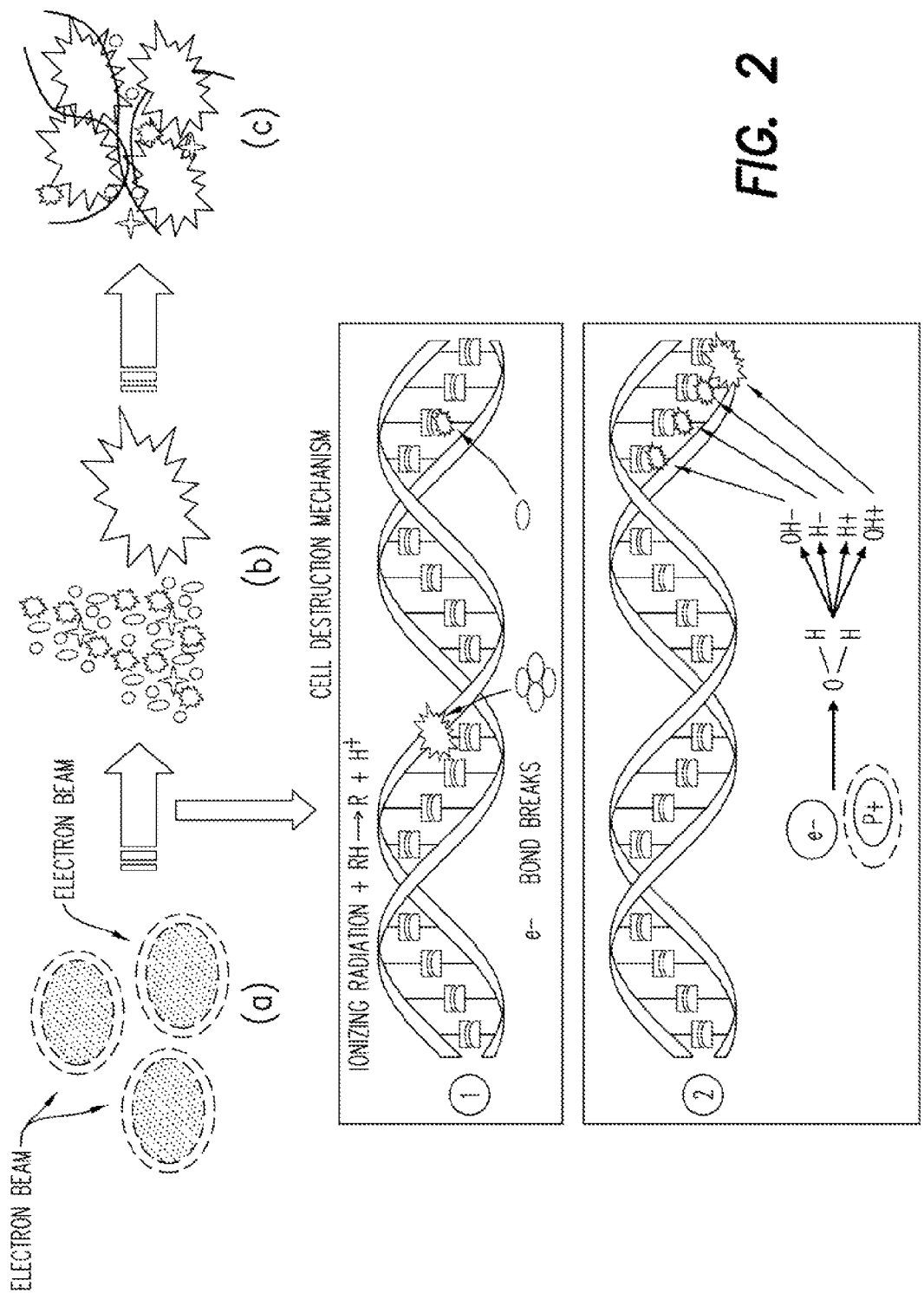
FIG. 2 is a schematic diagram showing a mechanism of killing marine organisms by electron beam irradiation according to the present invention.

More specifically, as shown in FIG. 2, when the electron beam is irradiated into the ballast water, the cell walls and nuclear membranes of harmful marine organisms are destroyed and damaged by the action of radicals, and the permeability of the nuclear membrane changes while extracellular polymeric substances are released from the destroyed cell wall as shown in FIG. 2(b). The extracellular polymeric substances serve as a flocculant inducing the three-dimensional crosslinking between the cells. As a result, as shown in FIG. 2(c), the extracellular polymeric substances form flocs by bioflocculation and are finally settled.

As described above, in the present invention, as the ballast water is continuously introduced into the reactor 121 and the electron beams generated from the electron accelerator 121 are continuously injected directly into the ballast water through the electron beam injection nozzle 122, the cell wall and nuclear membrane of harmful marine organisms present in the ballast water are damaged and destroyed, thereby killing the harmful organisms and sterilizing the ballast water. By such continuous injection of the electron beams, the treatment time for removing various contaminants from the ballast water can be reduced while the additional oxidation degradation of refractory organic matter can also be achieved, thus greatly increasing the efficiency of treatment of ballast water. In addition, the possibility of secondary contamination by the material remaining after electron beam irradiation can be eliminated.

The ballast water from which contaminants have been removed by the electron beam irradiation means 120 is transferred to the holding tank 130 from which it is discharged to the outside by the operation of the pump 140 placed behind the holding tank.

Thus, according to the present invention, by continuously injecting the electron beams directly into the ballast water, various contaminants can be removed from the ballast water in a rapid and simple manner, and the efficiency of treatment of the ballast water can be increased. Also, the ballast water from which contaminants have been removed is discharged to the coast, the possibility of contamination of the coast can be eliminated and the destruction and disturbance of the coast by foreign marine organisms can be very effectively prevented.

Figure 3:
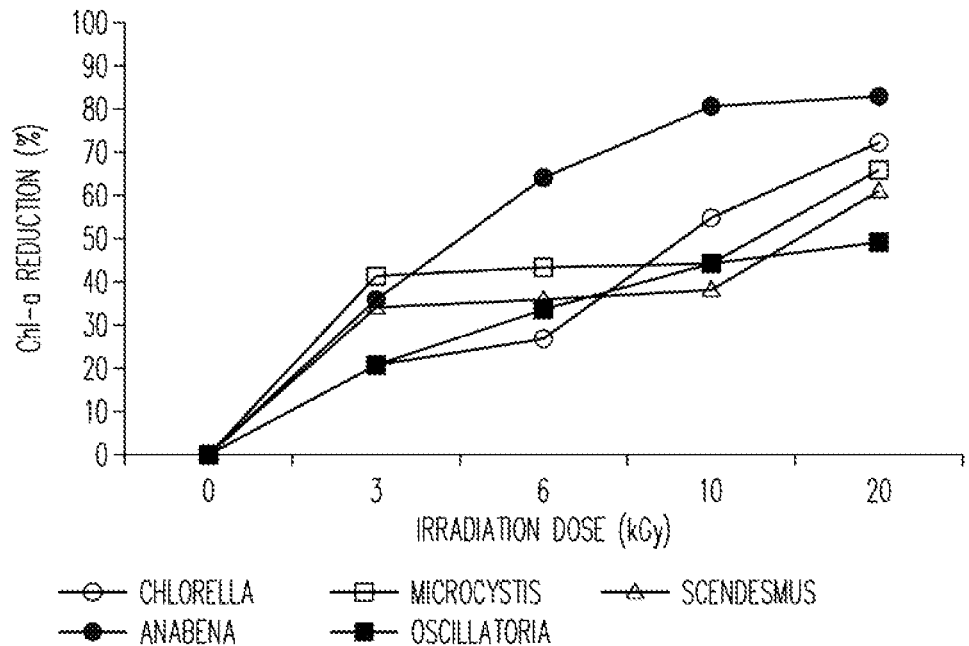
FIG. 3 is a graphic diagram showing the changes in the chlorophyll concentrations of alga according to the irradiation dose of an electron beam in the present invention.
Figure 3:
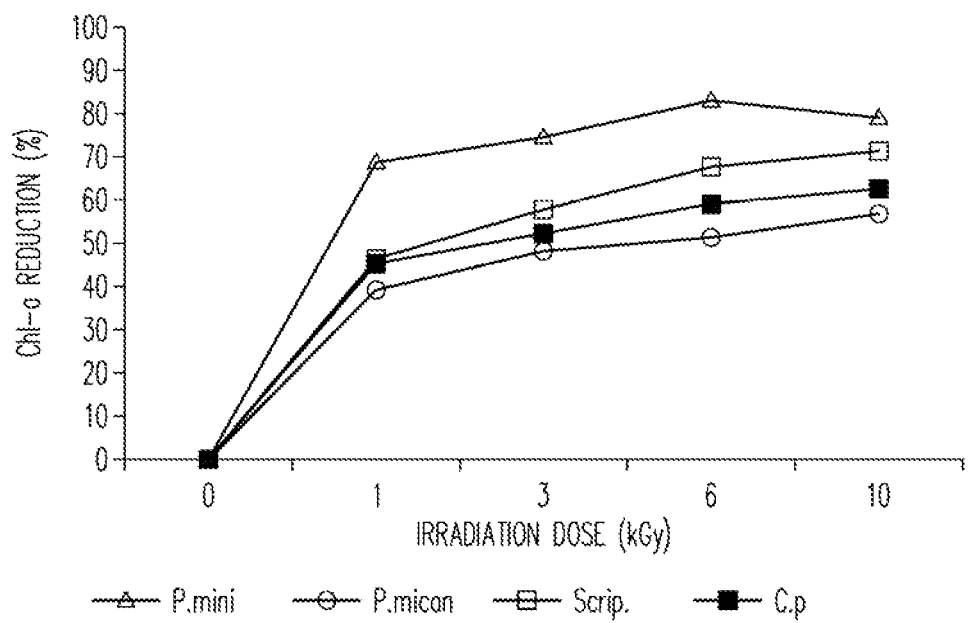
Figure 4:
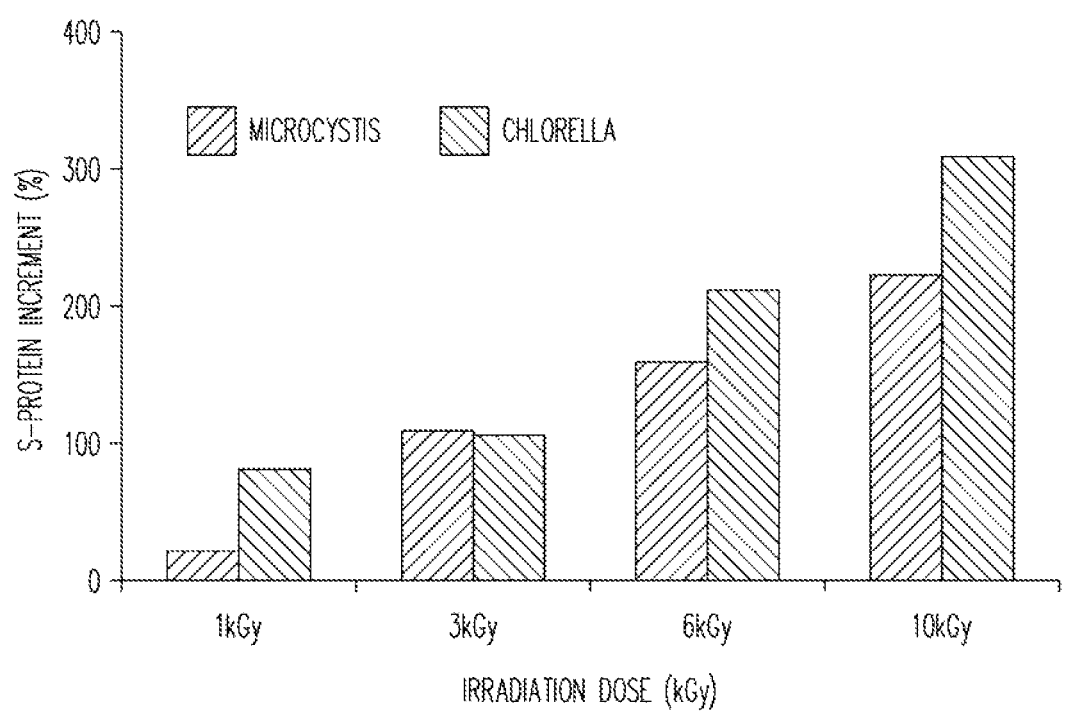
FIG. 4 is a graphic diagram showing the changes in the concentration of an extracellular polymeric substance after electron beam irradiation in the present invention.
Figure 5:
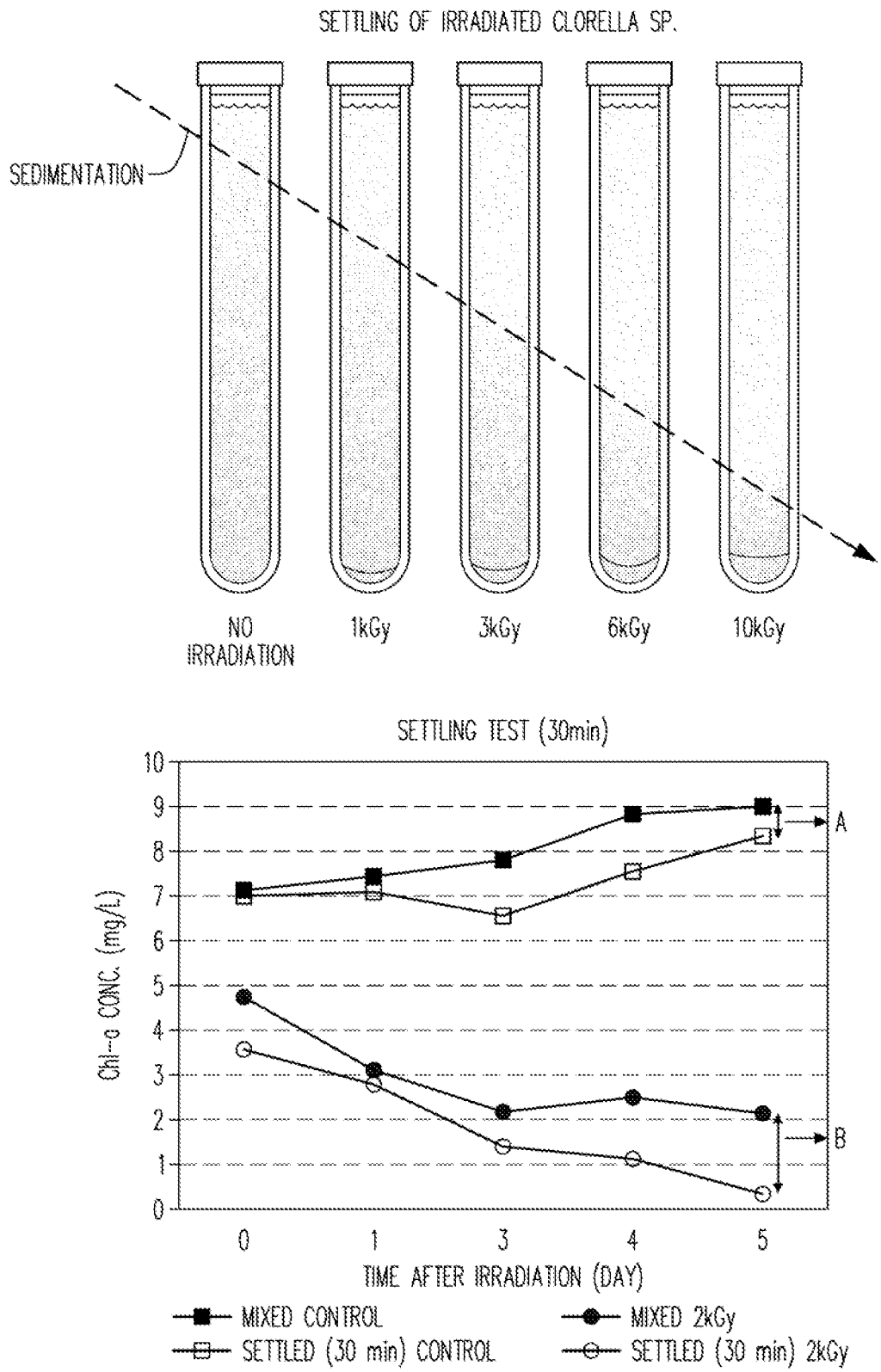
FIG. 5 is a drawing and graph showing the results of a setting test after electron beam irradiation in the present invention.

Meanwhile, FIGS. 3 to 5 show experimental data on the change in the physical and chemical characteristics of algae in ballast water irradiated with an electron beam according to the inventive apparatus and method for treating ballast water, and on the algae killing efficiency of the inventive apparatus and method.

FIG. 3 is a graphic diagram showing the changes in the chlorophyll concentrations of algae according to electron beam irradiation dose. As can be seen in FIG. 3, green alga (*Chlorella* sp.) shows a reduction in chlorophyll concentration of 55% when irradiated with an electron beam of 10 kGy, blue green alga (*Anabaena* sp.) shows a reduction in chlorophyll concentration of 65% when irradiated with an electron beam of 6 kGy, and red alga (*Prorocentrum minimum (P. mini)*) shows a reduction in chlorophyll concentration of 75% when irradiated with an electron beam of 3 kGy. Also, as the irradiation dose of the electron beam increases, the rate of reduction in the chlorophyll concentration of each alga, that is, the efficiency of killing of each alga, increases.

FIG. 4 is a graph showing the change in extracellular polymeric substances after electron beam irradiation. As can be seen therein, in both green alga (*Chlorella* sp.) and blue green alga (*Microcystis* sp.), the concentration of S-protein increases as the irradiation dose of the electron beam increases. This suggests that extracellular polymeric substances are released out of the cell wall destroyed by electron beam irradiation.

FIG. 5 depicts a drawing and graph showing the results of a settling test after electron beam irradiation. The drawing visually shows that, as the irradiation dose of the electron beam increases, green alga (*Chlorella* sp.) settles to change concentration. Also, as can be seen in the graph, in the groups irradiated with the electron beam, the change in chlorophyll concentration increases with time.

Accordingly, it can be seen that harmful marine organisms (such as algae) present in ballast water can be effectively controlled by electron beam irradiation according to the inventive apparatus and method for treating ballast water.

As described above, according to the present invention, by continuously irradiating electron beams directly into ballast water, the production and action of radicals by radiolysis of the ballast water can be continuously induced, so that the cells of harmful marine organisms, including viruses, bacteria and red algae, which are present in the ballast water, can be rapidly damaged and destroyed within a short time, thus making it possible to remove various contaminants from the ballast water in a simpler manner. Particularly, because the contaminants of the ballast water are removed by continuously injecting the electron beams, the treatment time for removing the contaminants from the ballast water can be reduced and the additional oxidative degradation of refractory organic matter can also be achieved, thus greatly increasing the efficiency of treatment of the ballast water.

Also, according to the present invention, because harmful marine organisms present in ballast water are destroyed and refractory organic matter is removed from the ballast water, the efficiency of treatment of the ballast water can be greatly increased. The possibility of secondary contamination by the material remaining after electron beam irradiation can be eliminated, and the destruction and disturbance of the marine ecosystem by ballast water can be prevented. In addition, a large amount of ballast water can be treated within a short time.

Although the preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for treating ship ballast water using electron beams, comprising:
   supplying the ballast water, and
   continuously introducing irradiating electron beams into the supplied ballast water to induce radiolysis of water sufficient to kill harmful marine organisms present in the ballast water and destroy cell walls of cells the organisms and release extracellular polymeric substances from the destroyed cell walls by radicals produced by the radiolysis by injecting the electron beams into the ballast water under operating conditions of an energy of 0.5-5 MeV, an electron beam irradiation dose of 0.1-30 kGy and a flow rate of 1-200 $m^3$/hr; and
   inducing three-dimensional crosslinking between the cells with the extracellular polymeric substances serving as a flocculant, forming flocs by bioflocculation, and settling the flocs.

2. The method of claim 1, comprising introducing the irradiating electron beams via electron beam irradiation means comprising an electron accelerator and an electronic beam in injection nozzle.

3. The method of claim 2, comprising supplying only ballast water from a storage tank to the electron beam irradiation means.

* * * * *